United States Patent
Shimoi et al.

(10) Patent No.: US 8,501,359 B2
(45) Date of Patent: Aug. 6, 2013

(54) FUEL CELL POWER PLANT AND CONTROL METHOD THEREOF

(75) Inventors: Ryoichi Shimoi, Yokohama (JP); Seiho Sugawara, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1226 days.

(21) Appl. No.: 11/994,165

(22) PCT Filed: Jun. 28, 2006

(86) PCT No.: PCT/JP2006/313361
§ 371 (c)(1),
(2), (4) Date: Dec. 28, 2007

(87) PCT Pub. No.: WO2007/007600
PCT Pub. Date: Jan. 18, 2007

(65) Prior Publication Data
US 2009/0123787 A1 May 14, 2009

(30) Foreign Application Priority Data
Jul. 14, 2005 (JP) .................................. 2005-205509

(51) Int. Cl.
*H01M 8/04* (2006.01)
(52) U.S. Cl.
USPC ............................ 429/428; 429/400; 429/408
(58) Field of Classification Search
USPC ................ 429/428, 429, 430, 432, 452, 454, 429/455, 456, 457
See application file for complete search history.

(56) References Cited

U.S. PATENT DOCUMENTS

| | | | |
|---|---|---|---|
| 6,835,479 B2 | 12/2004 | Balliet et al. | |
| 7,147,945 B2 | 12/2006 | Balliet et al. | |
| 2002/0058168 A1* | 5/2002 | Voss et al. | 429/13 |
| 2002/0075683 A1* | 6/2002 | Striebel et al. | 362/267 |
| 2002/0076583 A1* | 6/2002 | Reiser et al. | 429/13 |
| 2004/0072042 A1* | 4/2004 | Kim | 429/23 |
| 2004/0137292 A1 | 7/2004 | Takebe et al. | |
| 2005/0074641 A1 | 4/2005 | Inai et al. | |

FOREIGN PATENT DOCUMENTS

| | | |
|---|---|---|
| DE | 101 50 386 A1 | 4/2003 |
| JP | 06-283187 | 10/1994 |
| JP | 2002-246054 A | 8/2002 |
| JP | 2004-139950 A | 5/2004 |

(Continued)

OTHER PUBLICATIONS

Japanese Office Action; JP No. 2007-553040, issued May 24, 2011.

*Primary Examiner* — Ula C Ruddock
*Assistant Examiner* — Scott J Chmielecki
(74) *Attorney, Agent, or Firm* — Foley & Lardner LLP

(57) ABSTRACT

When stopping an operation of a fuel cell power plant, a controller (30) first stops fuel gas supply to an anode (2), then supplies a dry oxidant gas to a cathode (3) such that the output voltage of the fuel cell stack (1) decreases. The controller (30) then connects a secondary battery (31) to the fuel cell stack (1) so as to consume an output power generated by a reaction of the residual fuel gas in the anode (2). After this processing, the controller (30) replaces the residual fuel gas in the anode (2) with dry oxidant gas, then maintains the fuel cell stack (1) in a closed state, thereby preventing local cell formation in the anode due to mixing of the residual fuel gas with oxidant gas, and hence preventing corrosion of a catalyst layer of the cathode (3) due to local cell corrosion.

16 Claims, 11 Drawing Sheets

(56) References Cited

FOREIGN PATENT DOCUMENTS

| JP | 2004-172105 A | 6/2004 |
|---|---|---|
| JP | 2004-253220 A | 9/2004 |
| WO | WO-2004/004057 A1 | 1/2004 |
| WO | WO-2004/025269 A2 | 3/2004 |
| WO | WO-2004/049468 A2 | 6/2004 |
| WO | WO2004/049490 A2 | 6/2004 |

* cited by examiner

FUEL CELL POWER PLANT AND CONTROL METHOD THEREOF

FIELD OF THE INVENTION

This invention relates to post-operation control of a fuel cell power plant for preventing deterioration of electrodes of a fuel cell stack.

BACKGROUND OF THE INVENTION

After a fuel cell power plant using a fuel cell stack stops operating, in the fuel cell stack, air existing in a cathode may permeate an electrolyte membrane in the direction of an anode, and if a minute amount of fuel gas is left in the anode, the air that has passed into the anode may react with the fuel gas remaining therein to form a local cell in the anode.

This local cell forming phenomenon in the anode is expressed in FIG. 11. Herein, the main component of the fuel gas is hydrogen ($H_2$) and the oxidant gas is oxygen ($O_2$) in the air.

In a part of the anode 2, hydrogen ($H_2$) is separated into a hydrogen ion ($H^+$) and an electron ($e^-$), as expressed by the chemical formula (1) below.

$$H_2 \rightarrow 2H^+ + 2e^- \tag{1}$$

The hydrogen ion ($H^+$) permeates the electrolyte membrane and reaches the cathode. The electron ($e^-$) moves to another part of the anode 2, and reacts with the hydrogen ion ($H^+$) and oxygen ($O_2$) to form water ($H_2O$), as expressed by the chemical formula (2) below.

$$O_2 + 4H^+ + 4e^- \rightarrow 2H_2O \tag{2}$$

The hydrogen ion ($H^+$) used for this reaction is provided from the cathode 3 through the electrolyte membrane 1A.

In the cathode 3, oxygen ($O_2$) reacts with the hydrogen ion ($H^+$) provided from the anode and the electron ($e^-$) provided from the other part of the cathode 3 to form water as expressed by the chemical formula (3) below.

$$O_2 + 4H^+ + 4e^- \rightarrow 2H_2O \tag{3}$$

In the other part of the cathode, the following reactions occur as expressed by the chemical formulae (4), (5) below.

$$C + 2H_2O \rightarrow CO_2 + 4H^+ + 4e^- \tag{4}$$

$$2H_2O \rightarrow O_2 + 4H^+ + 4e^- \tag{5}$$

The reactions expressed by the chemical formulae (1) and (3) are normal reactions in a fuel cell. The reactions expressed by the chemical formulae (2), (4), (5) are not. These reactions are required for consuming an electron ($e^-$) that is produced in the other part of the anode 2 or for producing an electron ($e^-$) that is consumed in the other part of the cathode 3.

As a result, the electron ($e^-$) moves across the anode 2 and across the cathode 3, and a power current is generated in the anode 2 and the cathode 3 respectively.

Carbon (C) is used in the reaction expressed by the chemical formula (4). This carbon is obtained from a carbon material which forms a catalyst layer of the cathode 3, and as a result this reaction causes corrosion of the carbon layer of the cathode 3. This corrosion of the carbon layer of the cathode 3 is known as local cell corrosion.

In order to prevent deterioration of a membrane-electrode assembly (MEA) including local cell corrosion, JP2004-139950A, published by Japan Patent Office in 2004, proposes connecting the fuel gas passage to the oxidant gas passage and hermetically sealing these passages while electrically connecting an electrical load to the anode and cathode so as to cause the fuel gas and oxidant gas remaining in the fuel cell stack to be consumed through power generation, thereby suppressing the MEA from deteriorating after an operation stop of a fuel cell stack.

SUMMARY OF THE INVENTION

If the gas passages of the anode and the cathode are hermetically sealed after stopping an operation of the fuel cell stack, a pressure in the inner space of the gas passages may become negative, and when the stop state of the operation lasts for a long period of time, air may invade the gas passages from outside. If a minute amount of the fuel gas remains in the anode, the invaded air may react with the fuel gas to form a local cell. In other words, the prior art technique is not complete in view of preventing local cell formation.

It is therefore an object of this invention to completely prevent a local cell from being formed in the anode after a fuel cell stack has stopped operating.

In order to achieve the above object, this invention provides a fuel cell power plant comprising a fuel cell stack comprising an anode and a cathode, which generates power according to a reaction of a fuel gas supplied to the anode and an oxidant gas supplied to the cathode, a fuel gas supply device which supplies the fuel gas to the anode, an oxidant gas supply device which supplies a dry oxidant gas to the cathode, a fuel gas purge device which supplies a dry oxidant gas to the anode, an electrical load which can be connected to the fuel cell stack to consume power generated by the fuel cell stack, and a programmable controller.

The controller is programmed to control the fuel gas supply device to stop supplying the fuel gas to the anode in response to an operation stop command from outside, control the oxidant gas supply device to supply the dry oxidant gas to the cathode, control the electrical load to consume the power generated by the fuel cell stack, control the fuel gas purge device to supply the dry oxidant gas to the anode when a residual fuel gas amount in the anode has decreased to a predetermined amount, and control the fuel gas purge device to stop supplying the dry oxidant gas to the anode when the residual fuel gas in the anode has been replaced with the dry oxidant gas.

This invention also provides a control method of the fuel cell power plant. The method comprises controlling the fuel gas supply device to stop supplying the fuel gas to the anode in response to an operation stop command from outside, controlling the oxidant gas supply device to supply the dry oxidant gas to the cathode, controlling the electrical load to consume the power generated by the fuel cell stack, controlling the fuel gas purge device to supply the dry oxidant gas to the anode when a residual fuel gas amount in the anode has decreased to a predetermined amount, and controlling the fuel gas purge device to stop supplying the dry oxidant gas to the anode when the residual fuel gas in the anode has been replaced with the dry oxidant gas.

The details as well as other features and advantages of this invention are set forth in the remainder of the specification and are shown in the accompanying drawings.

DESCRIPTION OF THE PREFERRED EMBODIMENTS

Figure 1:
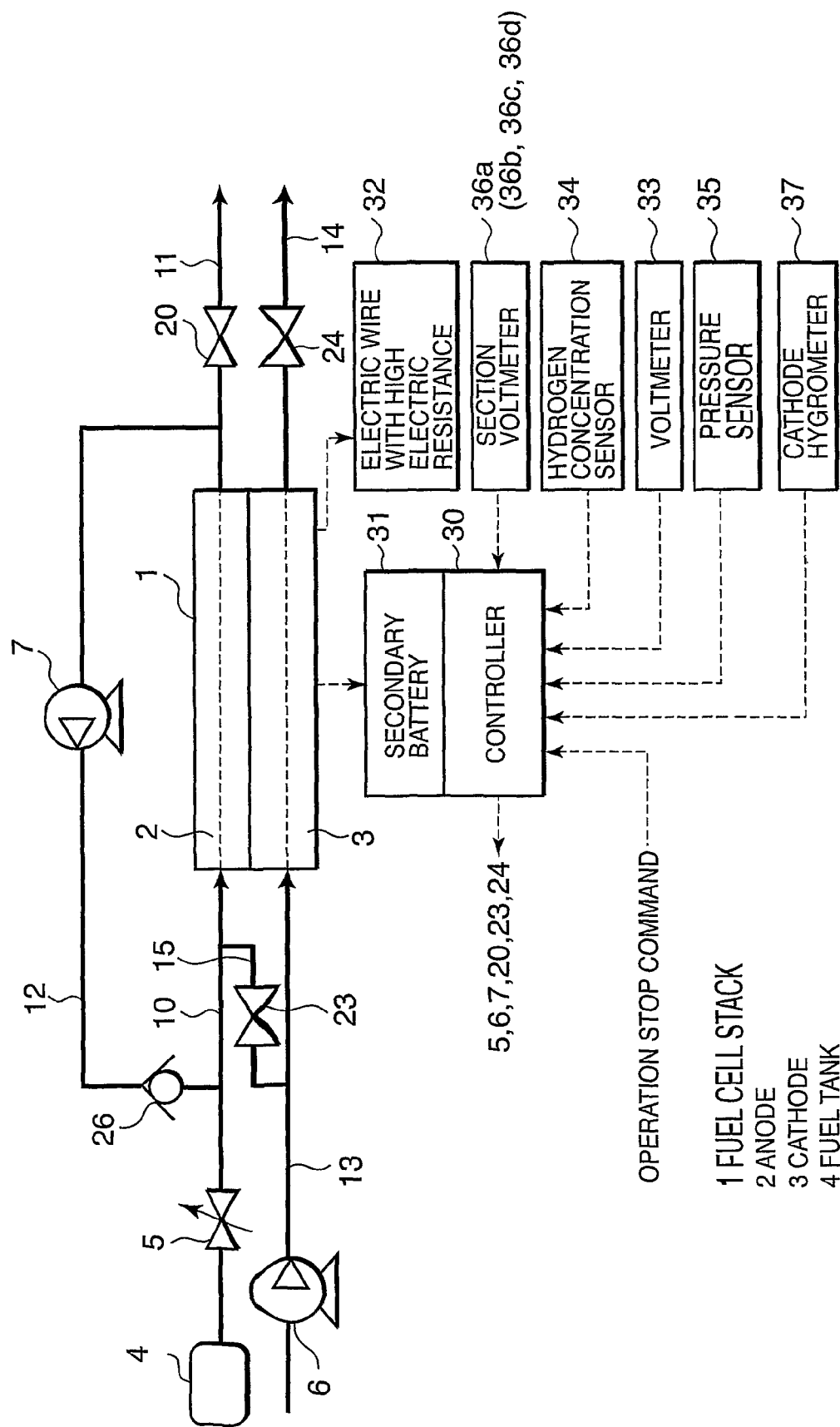
FIG. 1 is a schematic diagram of a fuel cell power plant according to this invention.

Referring to FIG. 1 of the drawings, a fuel cell power plant according to this invention comprises a fuel cell stack 1. The fuel cell stack 1 comprises an anode 2 and a cathode 3.

Although simplified in the figure, the fuel cell stack 1 is a stacked body of a number of unit cells, and each unit cell comprises an anode and a cathode. It should be noted that the anode 2 in the figure is a collective expression of all the anodes in the unit cells and the cathode 3 in the figure is a collective expression of all the cathodes in the unit cells.

A fuel tank 4 supplies pressurized fuel gas to the anode 2 via a fuel gas supply passage 10. The fuel gas is constituted by hydrogen or hydrogen rich gas, and a fuel gas flow control valve 5 is provided in the fuel gas supply passage 10 so as to regulate a supply amount of the fuel gas to the anode 2.

In the anode 2, hydrogen is separated into a hydrogen ion ($H^+$) and an electron ($e^-$). The hydrogen ion ($H^+$) permeates an electrolyte membrane separating the anode 2 and cathode 3 and moves towards the cathode 3. The electron ($e^-$) is extracted as a power current.

Fuel gas containing hydrogen which is not consumed in the anode 2 is discharged into an anode effluent discharge passage 11 as an anode effluent. The anode effluent discharge passage 11 communicates with the atmosphere through an anode effluent purge valve 20. A recirculation passage 12 which recirculates a part of the anode effluent to the fuel gas supply passage 10 is connected to the anode effluent discharge passage 11 at a point upstream of the anode effluent purge valve 20. The recirculation passage 12 is provided with a recirculation blower 7 and a check valve 26.

In a normal operation of the fuel cell power plant, when the recirculation blower 7 is operated, the anode effluent is recirculated to the fuel gas supply passage 10 through the recirculation passage 12 and the anode effluent purge valve 20.

The anode effluent then joins a flow of fuel gas supplied from the fuel tank 4 via the fuel gas flow control valve 5 and supplied again to the anode 2.

When the hydrogen concentration of the fuel gas supplied to the anode 2 lowers, the anode effluent purge valve 20 is opened so as to discharge the anode effluent into the atmosphere without recirculating it to the fuel gas supply passage 10. As a result, all of the fuel gas flowing in the fuel gas supply passage 10 is constituted only by the fuel gas supplied from the fuel tank 4, and accordingly the hydrogen concentration of the fuel gas supplied to the anode 2 rises. The anode effluent should be diluted or hydrogen contained therein should be consumed before it is discharged into the atmosphere such that the hydrogen concentration of the anode effluent decreases below a predetermined concentration.

Air is provided to the cathode 3 as an oxidant gas from the oxidant gas supply passage 13 when an oxidant gas supply blower 6 provided in the oxidant gas supply passage 13 is operated. In the cathode 3, water is produced by the reaction of oxygen in the supplied air with hydrogen which has been introduced through the electrolyte membrane. The air, which has a low oxygen concentration due to this reaction, is discharged into a discharge passage 14 as cathode effluent. The cathode effluent discharge passage 14 communicates with the atmosphere via a cathode effluent purge valve 24.

The fuel gas supply passage 10 and the oxidant gas supply passage 13 communicate with each other via a communication passage 15 which is provided with a communication valve 23.

According to this fuel cell power plant, in order to promote rapid consumption or dissipation of residual power in the fuel cell stack 1 after the power plant stops operating, a secondary battery 31 is connected to current collecting plates disposed on both sides of the fuel cell stack 1 when the power plant stops operating.

Instead of using the secondary battery 31 for the purpose of consuming residual power in the fuel cell stack 1, any electrical load which can consume electric power, such as an electric motor for driving the oxidant gas supply blower 6, an electric motor for driving the fuel gas recirculation blower 7, or a resistance unit, may be used.

Opening of the fuel gas flow control valve 5 and the communication valve 23, operations of the oxidant gas supply blower 6 and the recirculation blower 7, opening/closing of the purge valves 20, 24, and connection/disconnection of the secondary battery 31 are respectively controlled in response to command signals output from a controller 30.

The controller 30 is constituted by a microcomputer comprising a central processing unit (CPU), a read-only memory (ROM), a random access memory (RAM), and an input/output interface (I/O interface). The controller may be constituted by a plurality of microcomputers.

In order to perform the above control, a voltmeter 33 which detects a terminal voltage of the fuel cell stack 1, voltmeters 36a-36d, a hydrogen concentration sensor 34 which detects a hydrogen concentration of the fuel gas supplied to the fuel cell stack 1, a pressure sensor 35 which detects a gas pressure in the anode 2 of the fuel cell stack 1, and a cathode hygrometer 37 which detects a humidity in the cathode 3, are respectively connected to the controller 30 via signal circuits and signals representing the detection data from these sensors are input into the controller 30. The fuel cell stack 1 is divided into four stack sections each of which is constituted by plural unit cells stacked in series and the voltmeters 36a-36d are provided for detecting the output voltage of each stack section. Herein, four voltmeters 36a-36d are provided for detecting output voltages of four sections, but the number of the stack sections and voltmeters may be determined arbitrarily.

In FIG. 1, the fuel cell power plant is depicted in a simplified form. The fuel cell power plant comprises auxiliary devices such as a humidifier for humidifying the fuel gas and the oxidant gas, and a discharge pressure regulator, but such auxiliary devices are omitted from the figure.

Among the above components of the fuel cell power plant, the fuel tank 4, the fuel gas flow control valve 5, the recirculation blower 7, the fuel gas supply passage 10 and the recirculation passage 12 constitute the fuel gas supply device claimed in the Claims. The oxidant gas supply passage 13 and the oxidant gas supply blower 6 constitute the oxidant gas supply device claimed in the Claims. The communication passage 15 and the communication valve 23 constitute the fuel gas purge device claimed in the Claims.

Next, referring to a flowchart in FIG. 2 as well as to TABLE-1, an operation stop routine of the fuel cell power plant performed by the controller 30 will be described. The controller 30 performs this routine upon receiving a fuel cell power plant operation stop.

a short period of time, which is preferable in order to complete execution of the routine within a short period of time.

The fuel gas flow control valve 5, the recirculation blower 7, the communication valve 23, the anode effluent purge valve 20, the cathode effluent purge valve 24, and the secondary battery 31 are maintained in the same state as in the previous step S2 as specified in the line S3 in TABLE-1.

In a following step S4, the controller 30 determines if the cathode 3 has sufficiently dried up. Specifically, it can be determined that the cathode 3 has sufficiently dried up, when the elapsed time from when the start of the dry oxidant gas has reached a predetermined time. The predetermined time is preset by experiment or simulation.

When the dry oxidant gas is supplied to the cathode 3 at the maximum flow rate, an internal voltage of the fuel cell stack 1 rises, causing concern that the catalyst layer of the cathode 3 may corrode due to the high internal voltage of the fuel cell stack 1. However, the catalyst layer remains free from such corrosion as long as the duration of the high internal voltage is no longer than thirty seconds. It is therefore preferable to set the value of the predetermined time period within thirty seconds.

TABLE 1

| | | ANODE | | | | CATHODE | |
|---|---|---|---|---|---|---|---|
| STEP NUMBER | FUEL GAS FLOW CONTROL VALVE 5 | RECIRCULATION BLOWER 6 | COMMUNICATION VALVE 23 | ANODE EFFLUENT PURGE VALVE 20 | OXIDANT GAS SUPPLY BLOWER 6 | CATHODE EFFLUENT PURGE VALVE 24 | SECONDARY BATTERY 31 |
| S1 | OPEN | OPERATE | CLOSE | CLOSE | OPERATE | OPEN | OFF |
| S2 | CLOSE | OPERATE | CLOSE | CLOSE | OPERATE | OPEN | OFF |
| S3 | CLOSE | OPERATE | CLOSE | CLOSE | OPERATE | OPEN | OFF |
| S5 | CLOSE | OPERATE | CLOSE | CLOSE | OPERATE | OPEN | ON |
| S7 | CLOSE | OPERATE | OPEN | OPEN | OPERATE | OPEN | ON |
| S9 | CLOSE | STOP | CLOSE | CLOSE | STOP | CLOSE | ON |

The operations of the valves, blowers, and secondary battery in each step of the flowchart are listed in TABLE-1.

When the fuel cell stack 1 is operated normally, the controller controls the opening of the fuel gas flow control valve 5 according to the power generation load, operates the recirculation blower 7, closes the communication valve 23 and the anode effluent purge valve 20, operates the oxidant gas supply blower 6, opens the cathode effluent purge valve 24, and disconnects the secondary battery 31 from the fuel cell stack 1. These operation states are summarized in the first line denoted as S1 in TABLE-1. ON and OFF in the table correspond to a connected state and a disconnected state of the secondary battery 31.

Figure 2:
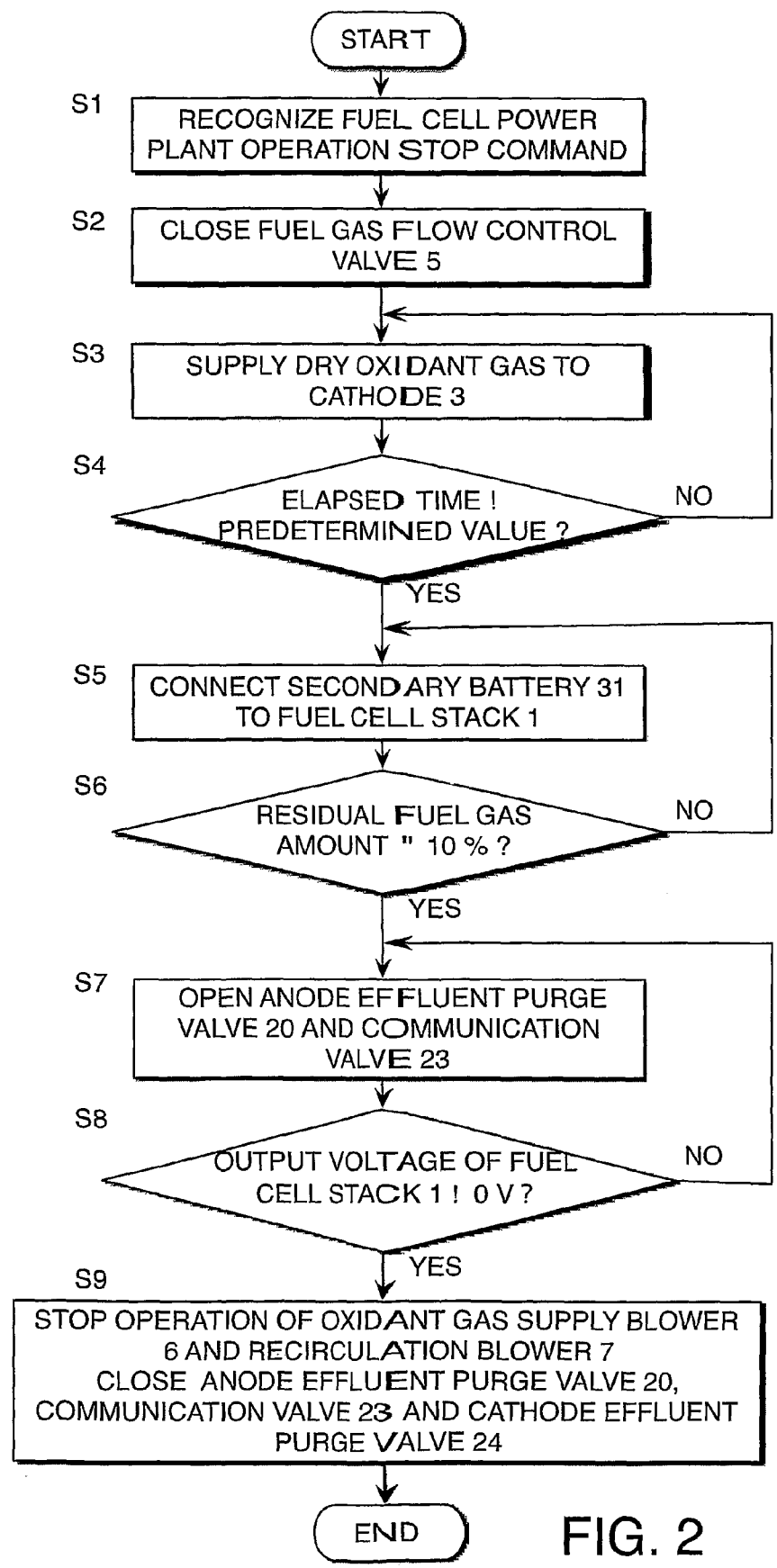
FIG. 2 is a flow chart describing am operation stop routine of a fuel cell power plant performed by a controller according to this invention.

Referring to FIG. 2, in a step S1, the controller 30 recognizes the fuel cell power plant operation stop command.

In a step S2, the controller 30 closes the fuel gas flow control valve 5. With respect to the recirculation blower 7, the communication valve 23, the anode effluent purge valve 20, the oxidant gas supply blower 6, the cathode effluent purge valve 24, and the secondary battery 31, the controller 30 maintains the same state as in the case when the fuel cell power plant is generating power, as summarized in the line S2 in TABLE-1.

In a following step S3, the controller 30 operates the oxidant gas supply blower 6 so as to supply dry oxidant gas to the cathode 3 at a maximum flow rate. Herein, the dry oxidant gas means an oxidant gas that is not humidified in the case of a power plant provided with a humidifier, or more preferably an oxidant gas that is dried using a moisture absorbent or the like. By the use of dry oxidant gas, the cathode 3 can be dried up in Alternatively, the humidity in the cathode 3 may be detected by the cathode hygrometer 37 such that the controller 30 determines that the cathode 3 has sufficiently dried up when the humidity in the cathode 3 has decreased to a predetermined humidity. Drying up of the cathode 3 is required so as to prevent the catalyst layer of the cathode 3 from corroding due to residual moisture in the cathode 3

As long as the determination in the step S4 is negative, the controller 3 repeatedly performs the processing of the step S3 until the determination in the step S4 becomes affirmative.

When the determination in the step S4 has become affirmative, the controller 3, in a step S5, connects the secondary battery 31 to the fuel cell stack 1.

With respect to the fuel gas flow control valve 5, the recirculation blower 7, the communication valve 23, the anode effluent purge valve 20, the oxidant gas supply blower 6, and the cathode effluent purge valve 24, the controller 30 maintains the same state as in the step S3, as summarized in the line S5 in TABLE-1.

According to the processing in the step S5, oxidant gas is supplied to the cathode 3 while the recirculation blower 7 is operative. It is preferable that the secondary battery 31 is connected to the fuel cell stack 1 in a state where the fuel gas concentration in all the anodes 2 of the unit cells constituting the fuel cell stack 1 is uniform.

When the processing of the step S5 is performed, a greater amount of oxidant gas exists in the cathode 3 than the amount of residual fuel gas in the anode 2. The fuel cell stack 1 therefore generates power using the residual fuel gas in the anode 2. The electric energy produced by this power generation reaction is consumed by the secondary battery 31 in the form of battery charging. According to the processing of the step S5, the residual fuel gas in the anode 2 gradually decreases.

In a following step S6, the controller 30 determines whether there is any fear of corrosion of the catalyst Layer in the cathode 3. Specifically, this determination is performed by determining if the residual fuel gas amount in the anode 2 has become equal to or less than 10 percent of the fuel gas amount in a normal power generation operation of the fuel cell stack 1, based on the gas pressure in the anode 2 detected by the pressure sensor 35.

Alternatively, the determination is performed by determining if the terminal voltage of the fuel cell stack 1 detected by the voltmeter 33 is equal to or less than a predetermined voltage. The predetermined voltage is typically set to 0.1-0.3 volts per unit cell. It is also possible to determine that there is no fear of corrosion of the catalyst layer in the cathode 3 when the minimum value of the output voltages of the stack sections detected by the voltmeters 36a-36d equals zero volts.

It is also possible to determine that there is no fear of corrosion of the catalyst layer in the cathode 3 when any one of the aforesaid two conditions, i.e. the terminal voltage of the fuel cell stack 1 being equal to or less than the predetermined voltage and the minimum value of the output voltages of the stack sections being equal to zero volt, is satisfied. It is also possible to perform the determination of the step S6 depending on the hydrogen concentration in the anode 2, which is detected by the hydrogen concentration sensor 34.

As long as there is a fear of corrosion of the catalyst layer in the cathode 3, the controller repeatedly performs the processing of the step S5.

When it is determined that there is no fear of corrosion of the catalyst layer in the cathode 3 in the step S6, the controller 30, in a step S7, opens the anode effluent purge valve 20 and the communication valve 23 substantially synchronously so as to supply the dry oxidant gas to the anode 2, while keeping the recirculation blower 7 operative.

With respect to the fuel gas flow control valve 5, the anode effluent purge valve 20, the oxidant gas supply blower 6, the cathode effluent purge valve 24, and the secondary battery 31, the controller maintains the same state as in the step S5, as summarized in the line S7 in TABLE-1.

It is preferable, however, to control the opening of the cathode effluent purge valve 24 in the following manner.

Specifically, a target distribution ratio of the dry oxidant gas supplied from the oxidant gas supply blower 6 to the anode 2 and to the cathode 3 is determined experimentally so as to minimize the corrosion speed of the catalyst layer of the cathode 3. Herein, the corrosion speed of the catalyst layer of the cathode 3 is predetermined based on the displacement rate of feel gas by oxidant gas in the anode 2 and the drying speed of the cathode 3. After determining a target distribution ratio, the controller 39 regulates the opening of the cathode effluent purge valve 24 such that the target distribution ratio is realized. By supplying the dry oxidant gas to the anode 2 under the target distribution ratio, replacement of the minute amount of residual fuel gas in the anode 2 with the dry oxidant gas is efficiently promoted.

In a following step S8, the controller 30 determines if replacement of the residual fuel gas in the anode 2 with the dry oxidant gas is complete. Specifically, when the output voltage of the fuel cell stack 1 detected by the voltmeter 33 or the voltages of the stack sections detected by the voltmeter 36a-36d becomes substantially equal to zero, the controller 30 determines that replacement is complete.

As long as the determination in the step S8 is negative, or in other words as along as replacement of the residual gas with the dry oxidant gas in the anode 2 is not complete, the controller 30 repeatedly performs the processing of the step S7.

When the determination in the step S8 has become affirmative, the controller 30, in a step S9, stops operation of the oxidant gas supply blower 6 and the recirculation blower 7, and closes the anode effluent purge valve 20, the communication valve 23 and the cathode effluent purge valve 24.

With respect to the fuel gas flow control valve 5 and the secondary battery 31, the controller 30 maintains the same state as in the step S7, i.e., it keeps the fuel gas flow control Valve 5 closed and the secondary battery 31 connected to the fuel cell stack 1.

The above processing is summarized in the line S9 in TABLE-1. After the processing of the step S9, the controller 30 terminates the routine.

When the non-operative state of the fuel cell power plant is predicted to last for a long period of time after stopping the operation thereof, it is preferable to connect an electric wire with high electric resistance to the fuel cell stack 1 such that it can always consume power and the difference between the potential of the anode 2 and that of the cathode 3 is maintained at a constant value.

Thus, by connecting the secondary battery 31 to the fuel cell stack 1 so as to consume the fuel gas in the anode 2, and by replacing the residual fuel gas in the anode 2 by the oxidant gas after the residual fuel gas amount in the anode 2 has become equal to or less than 10 percent of the fuel gas amount during a normal power generation operation of the fuel cell stack 1, the residual fuel gas and oxidant gas in the anode 2 can be prevented from mixing effectively. According to this power plant, the fuel cell stack 1 is preserved in a state where corrosion of the cathode catalyst layer due to mixing of the residual fuel gas with oxidant gas in the anode 2 is quite unlikely to occur, and hence the durability of the fuel cell power plant is enhanced.

Next, referring to FIG. 3 and TABLE-2, a second embodiment of this invention with respect to the operation stop routine will be described.

TABLE 2

| | | ANODE | | | | CATHODE | |
| STEP NUMBER | FUEL GAS FLOW CONTROL VALVE 5 | RECIRCULATION BLOWER 6 | COMMUNICATION VALVE 23 | ANODE EFFLUENT PURGE VALVE 20 | OXIDANT GAS SUPPLY BLOWER 6 | CATHODE EFFLUENT PURGE VALVE 24 | SECONDARY BATTERY 31 |
| --- | --- | --- | --- | --- | --- | --- | --- |
| S1 | OPEN | OPERATE | CLOSE | CLOSE | OPERATE | OPEN | OFF |
| S2 | CLOSE | OPERATE | CLOSE | CLOSE | OPERATE | OPEN | OFF |
| S3 | CLOSE | OPERATE | CLOSE | CLOSE | OPERATE | OPEN | OFF |
| S5A | CLOSE | OPERATE | CLOSE | CLOSE | OPERATE | OPEN | ON1 |
| S5B | CLOSE | OPERATE | CLOSE | CLOSE | OPERATE | OPEN | ON2 |

TABLE 2-continued

| | | ANODE | | | | CATHODE | |
|---|---|---|---|---|---|---|---|
| STEP NUMBER | FUEL GAS FLOW CONTROL VALVE 5 | RECIRCULATION BLOWER 6 | COMMUNICATION VALVE 23 | ANODE EFFLUENT PURGE VALVE 20 | OXIDANT GAS SUPPLY BLOWER 6 | CATHODE EFFLUENT PURGE VALVE 24 | SECONDARY BATTERY 31 |
| S7 | CLOSE | OPERATE | OPEN | OPEN | OPERATE | OPEN | ON2 |
| S9 | CLOSE | STOP | CLOSE | CLOSE | STOP | CLOSE | ON2 |

According to this embodiment, the fuel cell power plant applies an electric wire with high electric resistance 32 along with the secondary battery 31 as shown in FIG. 1 as an electrical load to dissipate the residual power in the fuel cell stack 1 after the power plant stops operating.

The electric wire with high electric resistance 32 is connected to the current collecting plates on both sides of the fuel cell stack L, in parallel with the secondary battery 31, in a state where it is possible to disconnect therefrom.

According to this embodiment, the secondary battery 31 and the electric wire with high electric resistance 32 constitute the electrical load in the Claims. Further, the secondary battery 31 constitutes the first electrical load and the electric wire with high electric resistance 32 constitutes the second electrical load.

Figure 3:
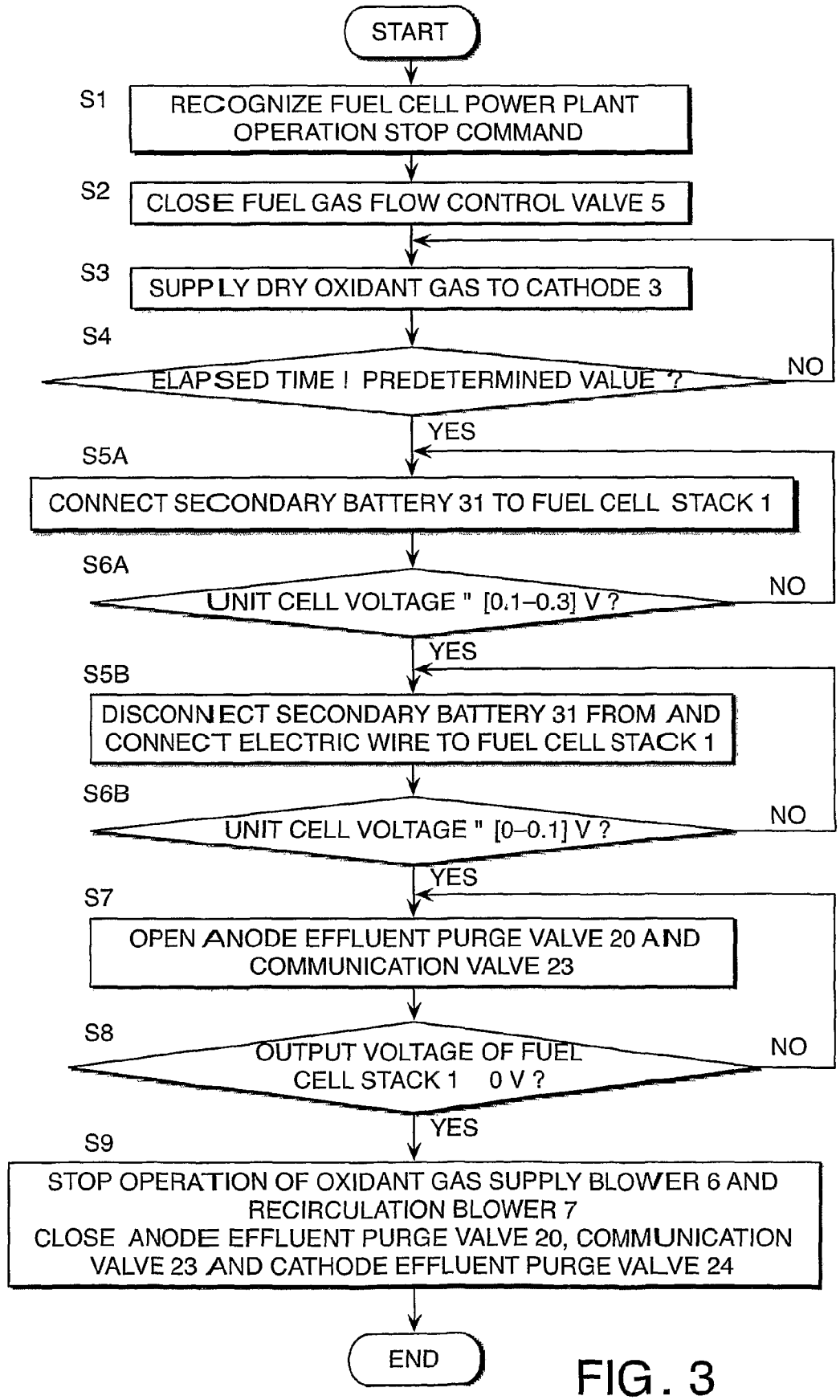
FIG. 3 is similar to FIG. 2, but shows a second embodiment of this invention.

The controller 30 performs an operation stop routine shown in FIG. 3 instead of the routine of FIG. 2. The routine of FIG. 3 differs from the routine of FIG. 2 in that the secondary battery 31 and the electric wire with high electric resistance 32 are selectively connected to the current collecting plates of the fuel cell stack 1 according to a fuel gas consumption state of the anode 2 during a period before starting dry oxidant gas supply to the anode 2.

For this purpose, the routine of FIG. 3 replaces the steps S5 and S6 of the routine of FIG. 2 with steps S5A, S6A, S5B and S6B. With respect to the other steps, the routine of FIG. 3 is identical to the routine of FIG. 2.

In the step S5A, the controller 30 connects the secondary battery 31 to the fuel cell stack 1. As described with respect to the first embodiment, an electric motor for driving the oxidant gas supply blower 6, an electric motor for driving the fuel gas recirculation blower 7, or a resistance unit may be used instead of the secondary battery 31. "ON1" in TABLE-2 corresponds to the state where the secondary battery 31 is connected to the fuel cell stack 1.

In the step S6A, the controller 30 determines if the terminal voltage of the fuel cell stack 1 detected by the voltmeter 33 has fallen to a range of 0.1-0.3 volts per unit cell, or the minimum value of the output voltages of the stack sections detected by the voltmeters 36a-36d has decreased to zero volts.

As long as the determination in the step S6A is negative, the controller 30 repeatedly performs the processing of the step S5A.

When the determination in the step S6A has become affirmative, the controller 30, in the step S5B, disconnects the secondary battery 31 from the fuel cell stack 1. When the output power of the fuel cell stack 1 is used for driving an auxiliary device such as an electric motor or dissipated in a resistance unit, these connections are shut off.

In contrast, the controller 30 connects the electric wire with high electric resistance 32 to the fuel cell stack 1. "ON2" in TABLE-2 corresponds to the state where the electric wire with high electric resistance 32 is connected to the fuel cell stack 1.

After the processing of the step S5B, the controller 30, in the step S6B, determines if the terminal voltage of the fuel cell stack 1 has fallen to a range of 0-0.1 volts per unit cell.

As long as the determination in the step S6B is negative, the controller 30 repeatedly performs the processing of the step S5B.

When the determination in the step S6B has become affirmative, the controller 30 performs the processing of the steps S7-S9 as in the routine of FIG. 2. However, with respect to the processing of the step S9, this routine is slightly different from the routine of FIG. 2. In the step S9 of this routine, the controller 31 maintains the state "ON2" as shown in TABLE-2, in which the electric wire with high electric resistance 32 is connected to the fuel cell stack 1 instead of the secondary battery 31.

By performing consumption or dissipation of the residual power of the fuel cell stack 1 in two stages by selectively applying plural electrical loads which have different resistances, the power consumption rate progressively decreases.

The progressive decrease in the power consumption rate helps in moderating fluctuations in the residual fuel gas amount in the unit cells. A progressive decrease in the power consumption rate is also preferable in preventing the catalyst layer corrosion promoted by a cause other than mixing of the residual fuel gas with oxidant gas.

By maintaining the connection between the electric wire with high electric resistance 32 and the fuel cell stack 1, power that may be generated in the fuel cell stack 1 in a non-operative state can always be dissipated. Even in a case where fuel gas still remains in the fuel cell stack 1 in a non-operative state and reacts with oxidant gas invading from outside, the power generated due to this reaction is dissipated in the electric wire with high electric resistance 32. Connection of the electric wire with high electric resistance 32 to the fuel cell stack 1 in a non-operative state is therefore preferable to prevent corrosion of the catalyst layer in the cathode 3.

Next, referring to FIGS. 4-6, third, fourth and fifth embodiments of this invention will be described. These embodiments relate to physical construction of the fuel cell power plant.

Figure 4:
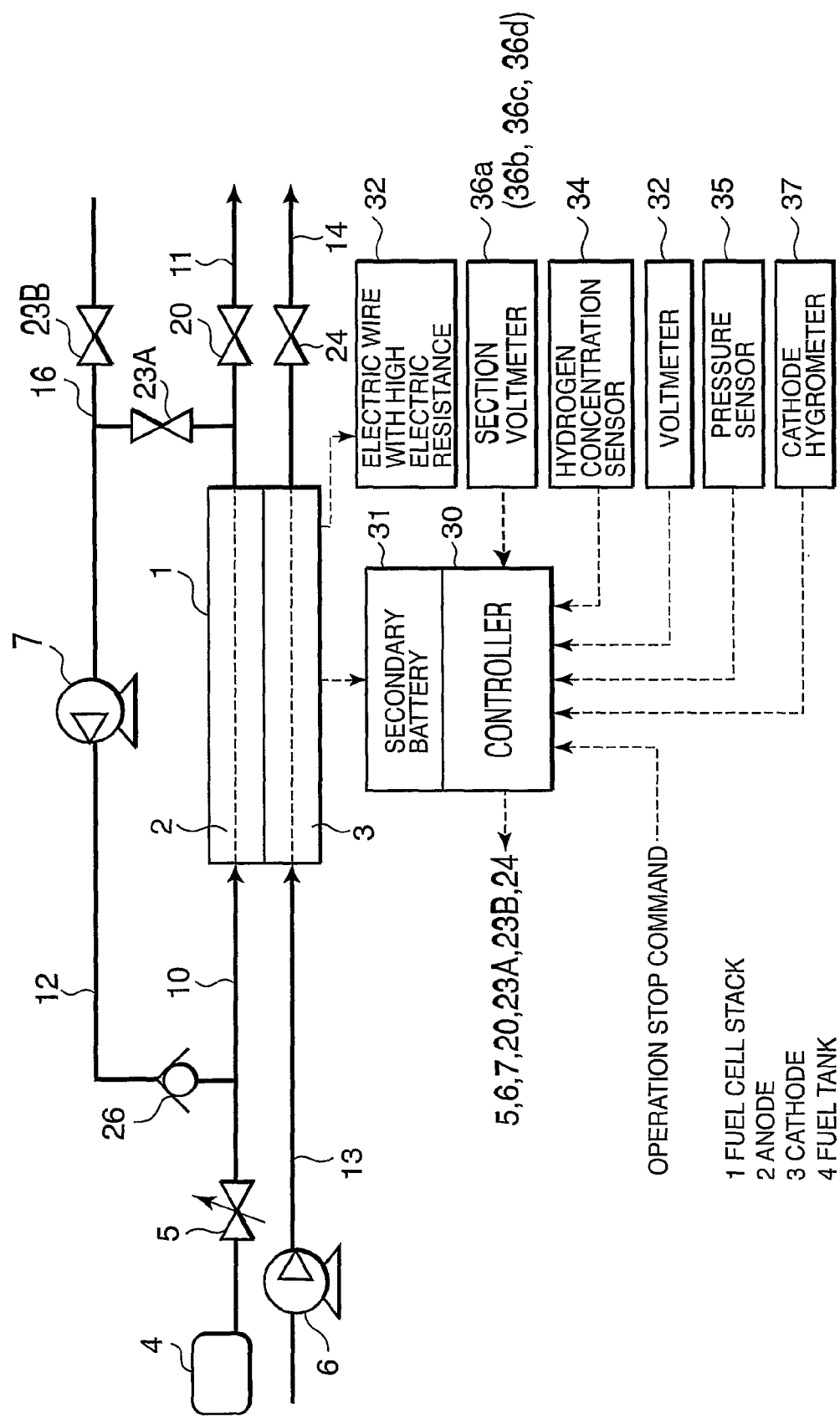
FIG. 4 is a schematic diagram of a fuel cell power plant according to a third embodiment of this invention.

The fuel cell power plant shown in FIG. 4, which corresponds to the third embodiment of this invention, comprises a recirculation valve 23A and an air vent 16 with an air vent valve 23B instead of the communication passage 15 with the communication valve 23 of the fuel cell power plant of FIG. 1.

The recirculation valve 23A is disposed in the recirculation passage 12 between the anode effluent discharge passage 11 and the recirculation blower 7. The air vent 16 is connected to the recirculation passage 12 at a point between the recirculation valve 23A and the recirculation blower 7, and introduces air into the recirculation passage 12 according to the operation of the recirculation blower 7. The air vent valve 23B opens and closes the air vent 16.

Figure 5:
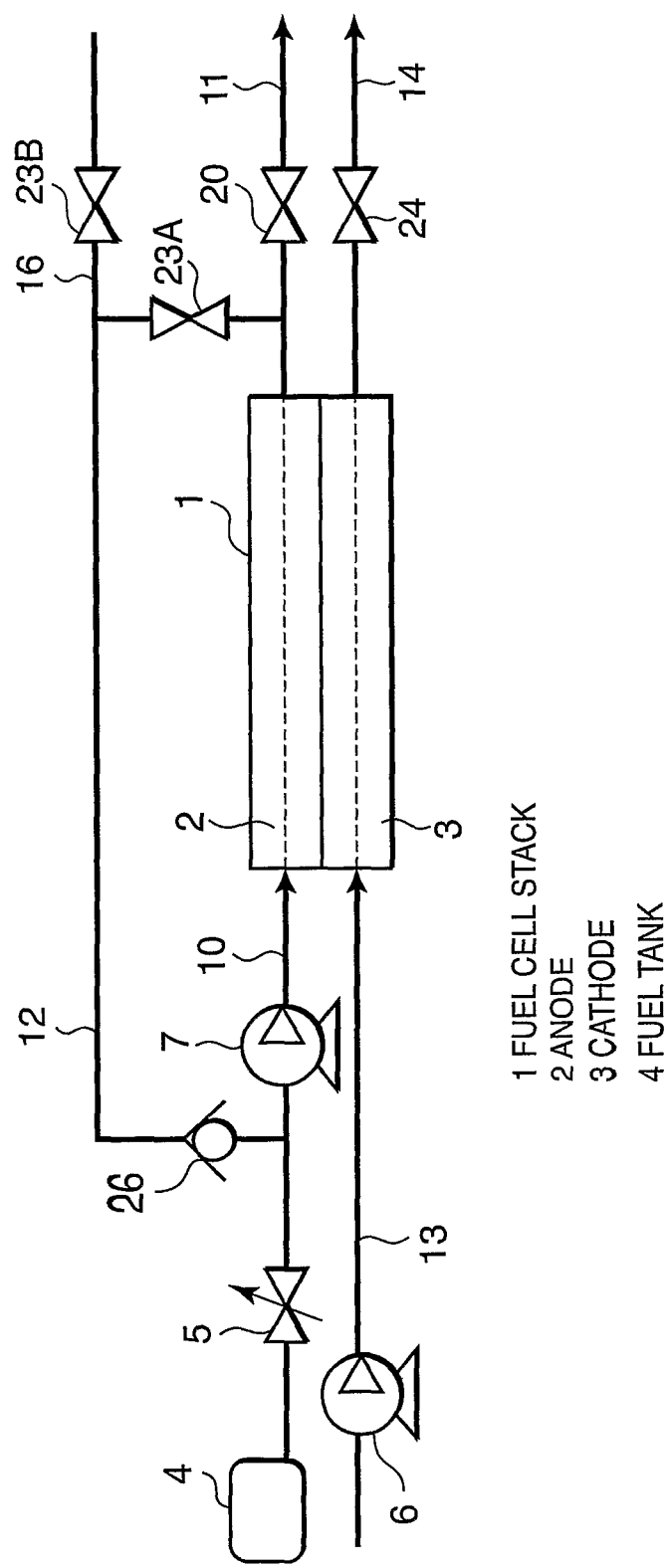
FIG. 5 is a schematic diagram of a fuel cell power plant according to a fourth embodiment of this invention.
Figure 6:
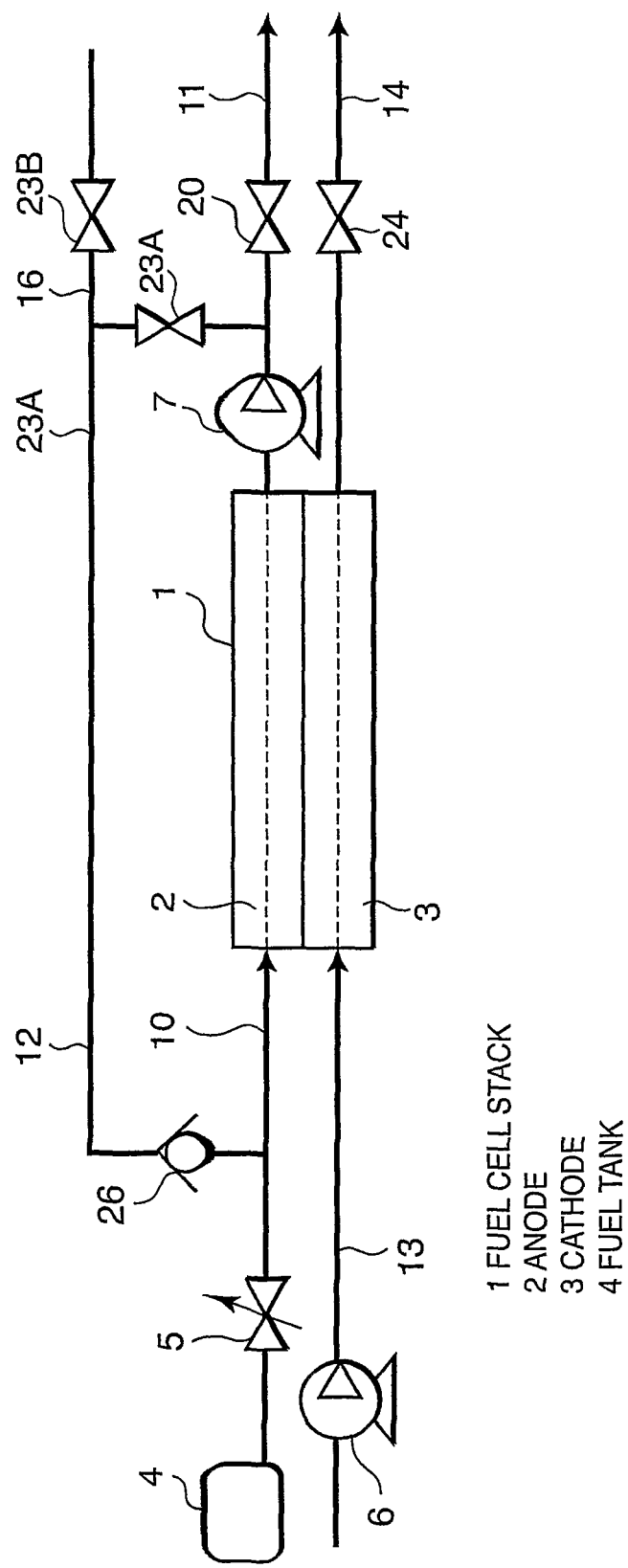
FIG. 6 is a schematic diagram of a fuel cell power plant according to a fifth embodiment of this invention.

The fuel cell power plant shown in FIG. 5, which corresponds to the fourth embodiment of this invention, and the fuel cell power plant shown in FIG. 6, which corresponds to the fifth embodiment of this invention are different from the third embodiment only in the location of the recirculation blower 7.

In the fuel cell power plant shown in FIG. 5, the recirculation blower 7 is disposed between the confluence of the fuel gas supply passage 10 with the recirculation passage 12 and the anode 2.

In the fuel cell power plant shown in FIG. 6, the recirculation blower 7 is disposed in the anode effluent discharge passage 11 between a bifurcation point of the recirculation passage 12 and the anode.

With respect to the operation stop routine of the fuel cell power plant, the controller 30 can perform any one of the routines of FIG. 2 and FIG. 4 in the third to fifth embodiments.

Specifically, during a normal operation of the power plant, the controller 30 operates the recirculation blower 7 in a state where the recirculation valve 23A is open and the air vent valve 23B is closed in order to reuse the anode effluent discharged from the anode 2. When the fuel cell stack 1 has stopped operating, in order to supply dry oxidant gas to the anode 2, or in other words to perform the processing of the step S7 in FIG. 2 or FIG. 3, the controller 30 operates the recirculation blower 7 in a state where the recirculation valve 23A is closed and the air vent valve 23B is open.

In the fuel cell power plant according to the third to fifth embodiments of this invention, the fuel tank 4, the fuel gas flow control valve 5, the recirculation blower 7, the fuel gas supply passage 10, the recirculation passage 12, and the recirculation valve 23A constitute the claimed fuel gas supply device. The oxidant gas supply blower 6 and the oxidant gas supply passage 13 constitute the claimed oxidant gas supply device. The air vent 16 and the air vent valve 23B constitute the claimed fuel gas purge device.

As described above, according to this invention, mixing of the residual fuel gas with oxidant gas in the fuel cell stack 1 after the operation of the power plant is stopped is prevented, and hence the occasions for corrosion of the cathode catalyst layer in the inoperative fuel cell stack 1 are reduced.

Further, in the fuel cell power plant according to the first and second embodiments of this invention, dry oxidant gas is supplied to the anode 2 after the power plant stops operating using both the oxidant gas supply blower 6 and the recirculation blower 7. This makes it possible to supply a greater amount of dry oxidant in a shorter period of time so that the anode 2 is rapidly filled with an oxidant atmosphere. Prevention of corrosion of the cathode catalyst layer can thus be achieved in a short period of time.

In contrast, in the fuel cell power plant according to the third to fifth embodiments of this invention, after the power plant stops operating, dry oxidant gas is supplied to the cathode 3 using the oxidant gas supply blower 6 while dry oxidant gas is supplied to the anode 2 using the recirculation blower 7. This make it possible to control the flow rate of the dry oxidant gas supply to the anode 2 and the flow rate of the dry oxidant gas supply to the cathode 3 independently from each other. The process of catalyst layer corrosion prevention can therefore be optimized according to these embodiments.

Still further, since the whole amount of the residual fuel gas in the fuel supply path can be replaced with dry oxidant gas according to these embodiments, the possibility of intermixing between the residual fuel gas and the oxidant gas in the fuel cell stack 1 while the power plant is non-operative is reduced, and hence corrosion of the cathode catalyst layer can be prevented more reliably.

Next, referring to FIGS. 7-10, research results with respect to the relationship between the residual hydrogen gas in the anode and corrosion of the cathode catalyst layer of the fuel cell stack, which were obtained by the inventors through experiments and simulations will be described.

Figure 7:
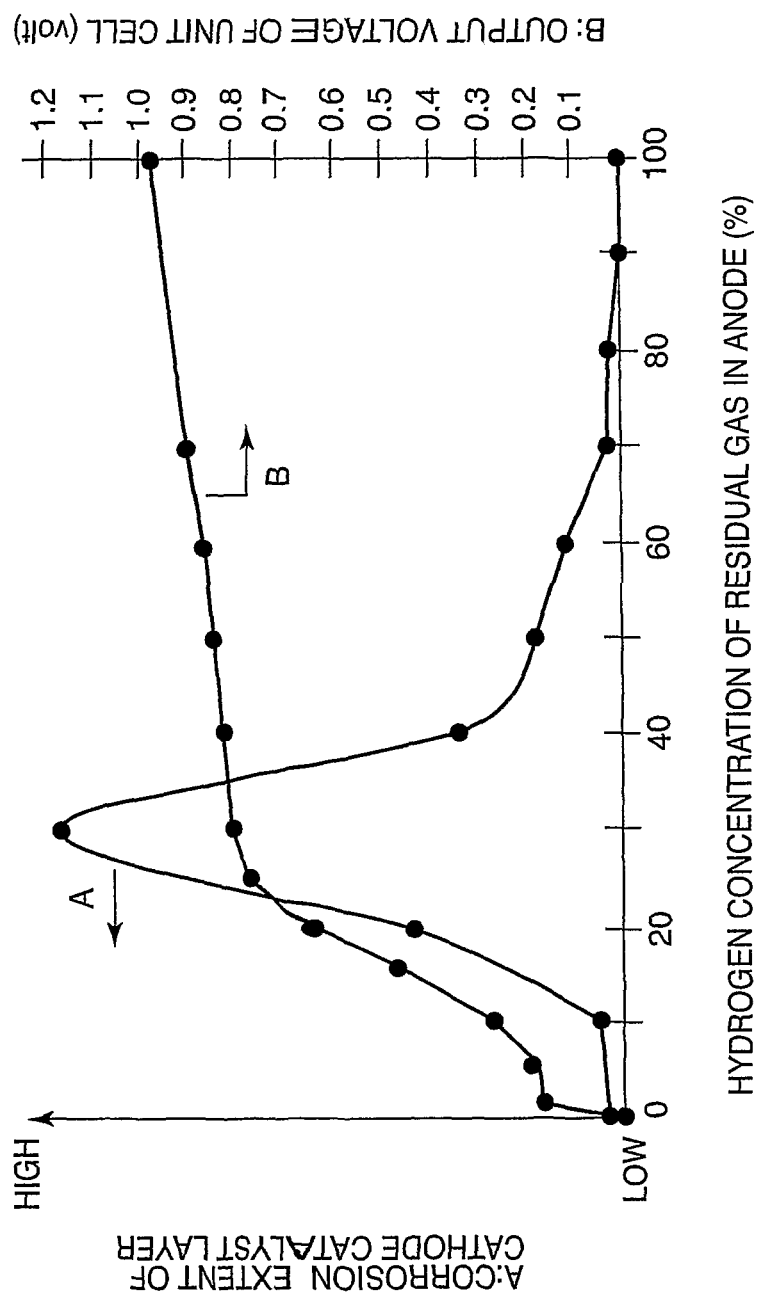
FIG. 7 is a diagram showing a relationship among a hydrogen concentration of residual gas in the anode after the fuel cell power plant has stopped operating, an output voltage of a unit cell, and a degree of corrosion on a catalyst layer of the cathode.

FIG. 7 shows the relationship between the output voltage of each unit cell and the degree of corrosion of the cathode catalyst layer in a state where a mixture of hydrogen and air exists in the anode while the cathode is filled with air.

The curve A in the figure denotes the degree of corrosion of the anode, and the curve B denotes the output voltage of a unit cell. This tendency is common to a case where a fuel gas other than hydrogen or an oxidant gas other than air is used.

When a local cell is formed in the anode, a part of the carbon which forms the catalyst layer in the cathode is corroded and carbon dioxide ($CO_2$) is generated as a result. The inventors have focused on this relationship and the degree of corrosion of the cathode catalyst layer is herein represented by a generation amount of carbon dioxide.

According to the curve A, when the residual hydrogen gas in the anode has a hydrogen concentration of 20-60 percent, the cathode catalyst layer shows a high degree of corrosion. In order to prevent catalyst layer corrosion, it is preferable to suppress the hydrogen concentration of the residual hydrogen gas in the anode to or below 10 percent.

According to the curve B, the hydrogen concentration of the residual hydrogen gas in the anode of a unit cell has a close relationship with the output voltage thereof. In this figure, the hydrogen concentration of the residual hydrogen gas becomes equal to 10 percent when the output voltage of the unit cell is 0.3 volts. Hence, by controlling the output voltage of the unit cell to be less than 0.3 volts, the hydrogen concentration is suppressed to less than 10 percent.

If the output voltage is decreased to zero volts, the prevention of the cathode catalyst layer corrosion will be optimized. However, decreasing the output voltage of all the unit cells to zero volts will takes a long time. As the time period of power consumption or dissipation increases, differences which appear in the output voltages of the unit cells becomes large, and some unit cells may suffer a lack of fuel gas that can be another cause for corrosion of the catalyst layer.

A realistic solution to the above situation is therefore to set a target value for decreasing the output voltage of the unit cells to 0.1 volts or above.

Figure 8:
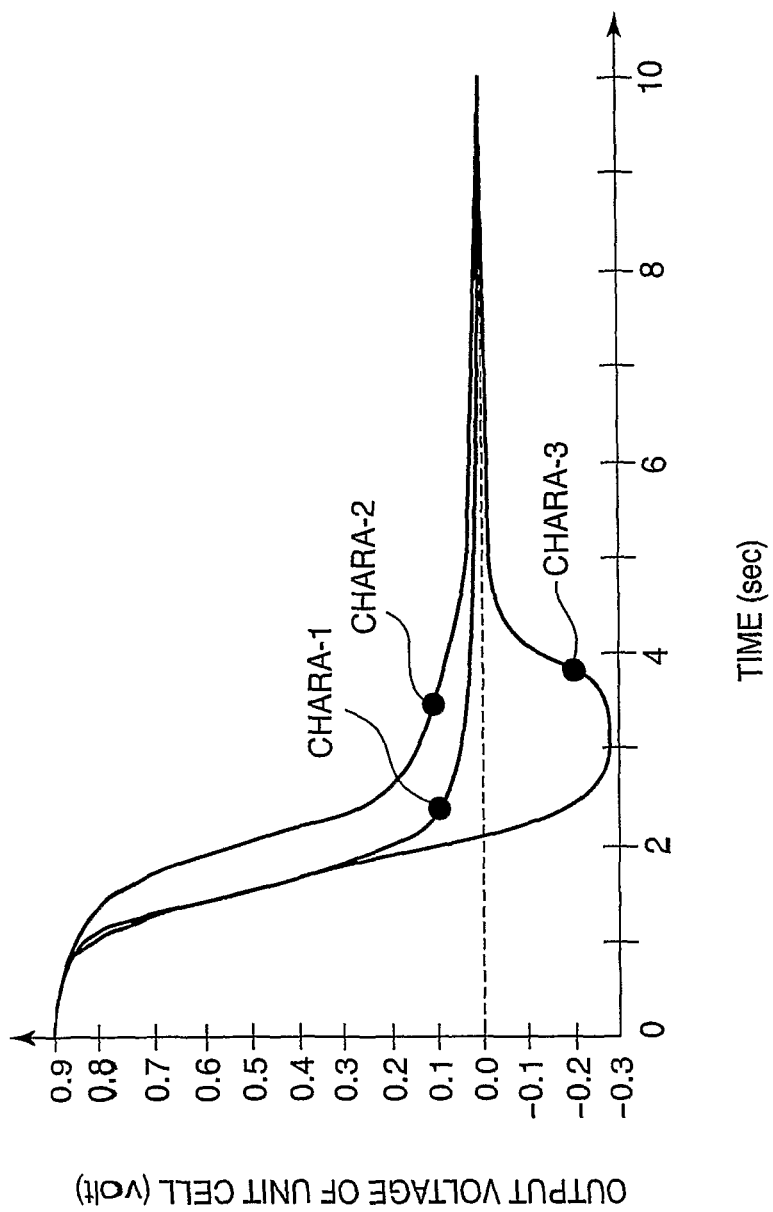
FIG. 8 is a timing chart illustrating time dependent variation in an output voltage of a unit cell after the fuel cell power plant has stopped operating.

FIG. 8 shows time dependent variation in the output voltage of a unit cell after the fuel cell power plant stops operating. CHARA-1 represents ideal variation in the output voltage which is expected to be obtained by this invention. CHARA-2 and CHARA-3 represent variations that may appear in a power plant to which this invention is not applied.

If fluctuations occur in the residual fuel gas amount in the unit cells when the fuel cell power plant has stopped operating, a large deviation can be expected in the output voltage variation characteristics of the unit cells, as shown by CHARA-2 and CHARA-3.

CHARA-3 represents a case where the unit cell suffers a lack of fuel gas. Despite the lack of fuel gas, the unit cell tends to generate a power current internally, which results in a negative output voltage. Negative output voltage can be a cause of corrosion of the anode catalyst layer, and hence it is desirable to prevent the output voltage from becoming negative in order to prevent corrosion.

Figure 9:
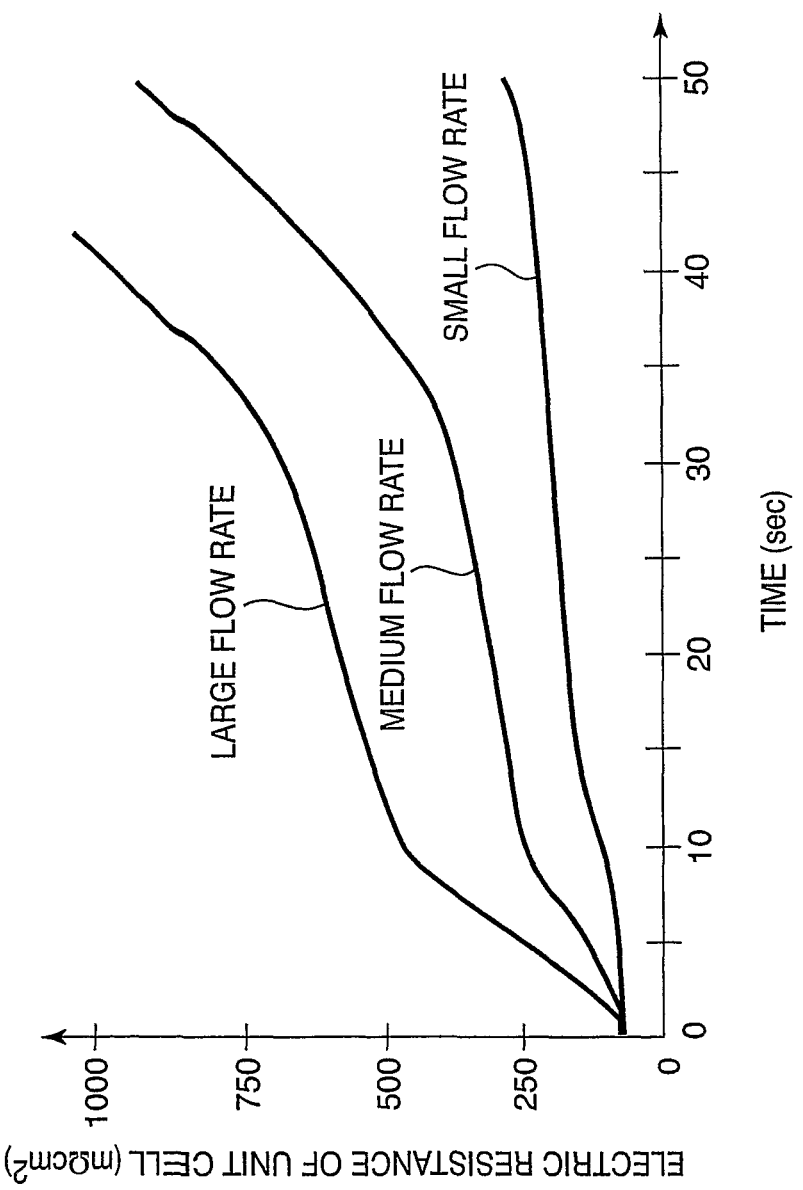
FIG. 9 is a timing chart illustrating a relationship between a flow rate of dry oxidant gas supplied to the anode after the fuel cell power plant has stopped operation and variation in the resistance of a unit cell.

FIG. 9 shows time dependent variation in the electric resistance of a unit cell with respect to the flow rate of the dry oxidant gas supplied to the anode for the purpose of replacing the residual fuel gas.

The electric resistance of a unit cell can be used as a parameter showing a drying state of the membrane-electrode assembly (MEA) in the unit cell. As the electric resistance increases, the aridity of the MEA increases, or as the electric resistance decreases, the aridity of the MEA decreases or the MEA becomes wet. As can be seen in this figure, in order to dry the anode in a short period of time, the dry oxidant gas has to be supplied to the anode at a large flow rate. If such a large flow rate is realized, the electric resistance of the unit cell can reach ten times the electric resistance of the unit cell in a state where it stopped operating, within about thirty seconds from when the unit cell stopped operating.

Figure 10:
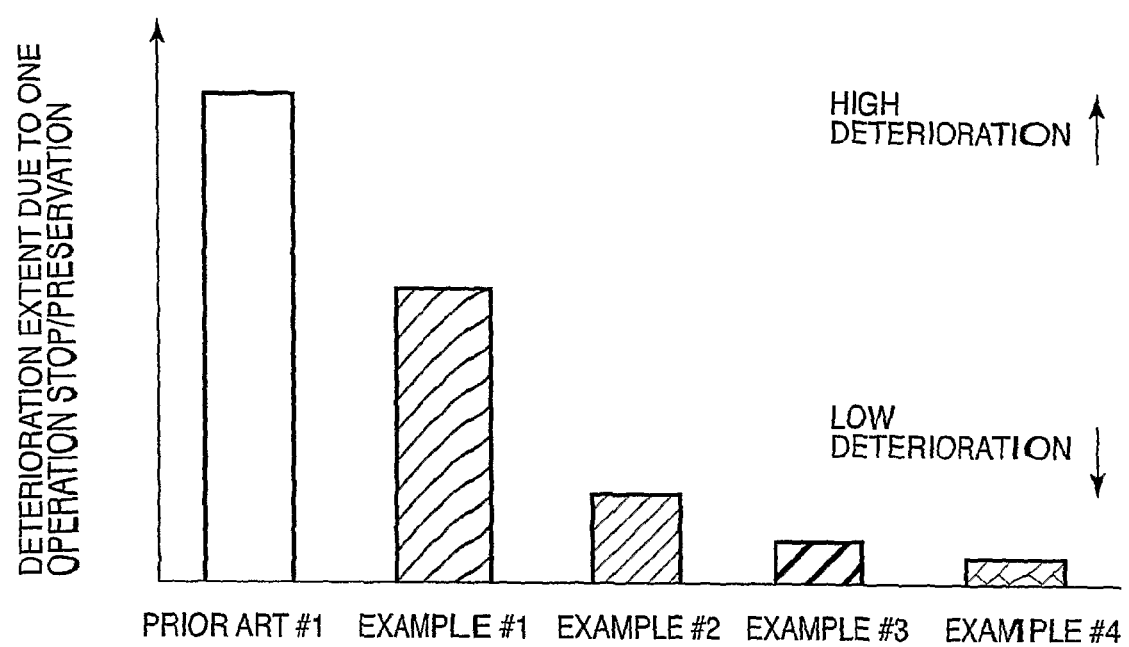
FIG. 10 is a diagram showing the degree of corrosion on the catalyst layer of the cathode in the fuel cell power plant according to this invention with respect to the degree of corrosion on the catalyst layer of the cathode in a conventional fuel cell power plant.
Figure 11:
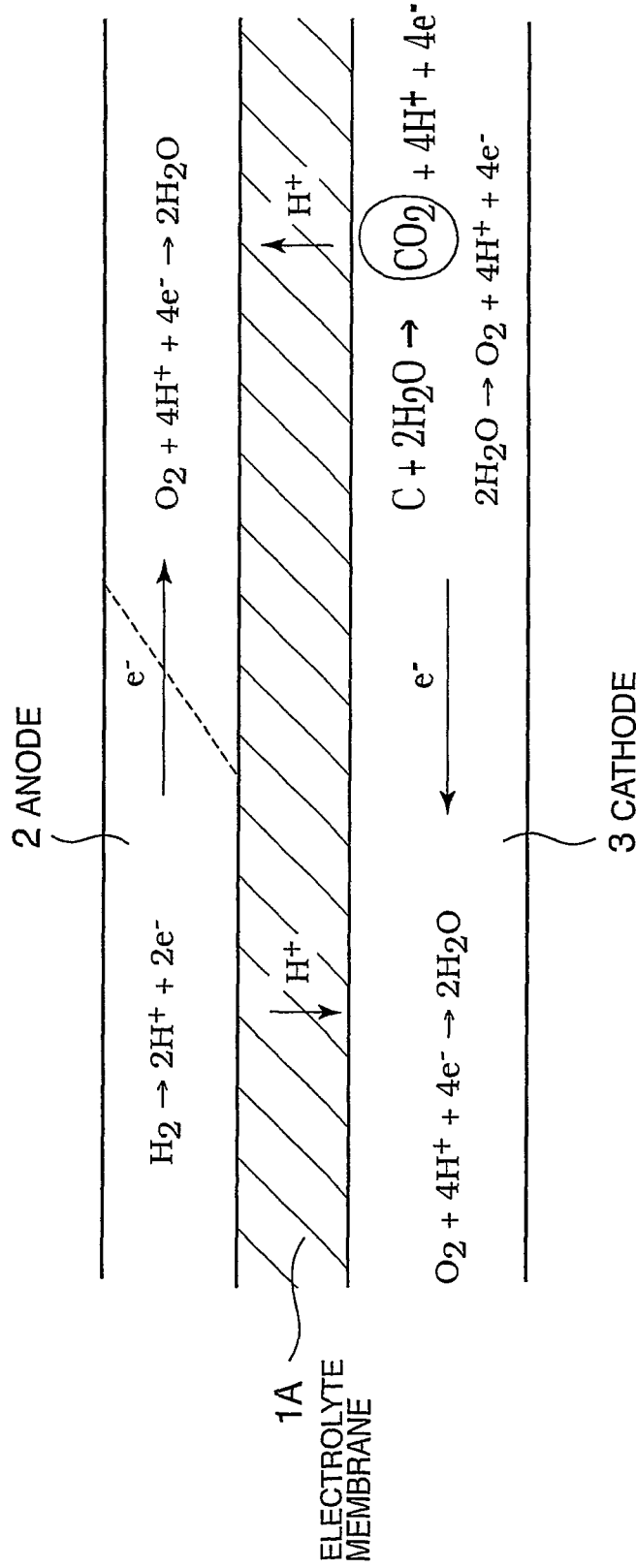
FIG. 11 is a diagram illustrating local cell formation in a fuel cell, which causes corrosion of a catalyst layer of a cathode.

FIG. 10 is a diagram for comparing a local cell forming prevention effect when a fuel cell power plant has stopped operating according to this invention, together with prior art examples.

PRIOR ART #1 shows the degree of corrosion of a cathode catalyst layer when no processing is performed to prevent local cell formation.

Example #1 shows the degree of corrosion of the cathode catalyst layer when only cathode drying processing is performed on the inoperative fuel cell power plant.

Example #2 shows the degree of corrosion of the cathode catalyst layer when cathode drying processing and fuel cell stack power consumption using a secondary battery are performed on the inoperative fuel cell power plant. Example #2 shows a preferable effect in preventing corrosion of the cathode catalyst layer, but if the residual fuel gas amount in the anode is not uniform, the anode catalyst layer may corrode.

Example $3 shows the degree of corrosion of the cathode catalyst layer when the residual fuel gas is replaced with dry oxidant gas after performing the same process as performed in Example #2. By replacing the residual fuel gas with dry oxidant gas, the output voltages of the unit cells can be decreased uniformly. Hence, in the case of Example #3, catalyst layer corrosion when the fuel cell stack is preserved in a non-operative state seldom occurs.

Example #4 shows the degree of corrosion of the cathode catalyst layer when all the valves are closed after performing the same process as performed in Example #3. With respect to the fuel cell power plant shown in FIG. 1, Example #4 corresponds to a case where the fuel gas flow control valve 5, the anode effluent purge valve 20 and the cathode effluent purge valve 24 are closed in the step S9 after performing the processing of the steps S1-S8. In the case of the fuel cell power plants shown in FIGS. 4-6, the air vent valve 23B is also closed in the step S9.

By closing the various valves connected to the fuel cell stack after replacing the residual fuel gas in the fuel cell stack with dry oxidant gas, deterioration of the MEA, including corrosion of the cathode catalyst layer, after the fuel cell power plant stops operating is prevented more completely than in the case of Example #3.

The contents of Tokugan 2005-205509, with a filing date of Jul. 14, 2005 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

INDUSTRIAL FIELD OF APPLICATION

As described above, this invention has an advantage in the prevention of deterioration of the MEA of the fuel cell stack, including the prevention of corrosion of the cathode catalyst layer, after the fuel cell power plant stops operating. Hence, a preferable effect is anticipated when this invention is applied to a fuel cell power plant for a vehicle where the operations of the power plant are started and stopped frequently.

The embodiments of this invention in which an exclusive property or privilege is claimed are defined as follows:

1. A fuel cell power plant comprising:
   a fuel cell stack comprising an anode and a cathode, which generates power according to a reaction of a fuel gas supplied to the anode and an oxidant gas supplied to the cathode;
   a fuel gas supply device which supplies the fuel gas to the anode;
   an oxidant gas supply device which supplies a dry oxidant gas to the cathode;
   a fuel gas purge device which supplies a dry oxidant gas to the anode; and
   a programmable controller programmed to:
     control the fuel gas supply device to stop supplying the fuel gas to the anode in response to an operation stop command from outside;
     control the oxidant gas supply device to supply the dry oxidant gas to the cathode;
     control the fuel gas purge device to supply the dry oxidant gas to the anode when a residual fuel gas amount in the anode has decreased to a predetermined amount; and
     control the fuel gas purge device to stop supplying the dry oxidant gas to the anode when the residual fuel gas in the anode has been replaced with the dry oxidant gas,
   further comprising a first electrical load and a second electrical load made of an electric wire which has a lower power consumption rate than the first electrical load, wherein the controller is further programmed to connect the first electrical load to the fuel cell stack after the fuel gas supply device has stopped supplying the fuel gas to the anode, then disconnect the first electrical load from the fuel cell stack, and then connect the second electrical load prior to supplying the dry oxidant gas to the anode.

2. The fuel cell power plant as defined in claim 1, further comprising an anode effluent discharge passage combined with an anode effluent purge valve for discharging the fuel gas after reaction in the anode as an anode effluent, and a cathode effluent discharge passage combined with a cathode effluent purge valve for discharging the oxidant gas after reaction in the cathode as a cathode effluent, wherein
   the fuel gas supply device comprises a fuel gas supply passage connected to the anode, a recirculation passage which recirculates the anode effluent in the anode effluent discharge passage to the fuel gas supply passage, a recirculation blower which promotes recirculation of the anode effluent in the recirculation passage, a fuel gas flow control valve which regulates a flow rate of the fuel gas in the fuel gas supply passage, wherein the recirculation passage is connected to the fuel gas supply passage between the fuel gas flow control valve and the anode, and connected to the anode effluent discharge passage between the anode and the anode effluent purge valve;
   the oxidant gas supply device comprises an oxidant gas supply passage connected to the cathode, and an oxidant gas supply blower disposed in the oxidant gas supply passage;
   the fuel gas purge device comprises a communication passage which branches off from the oxidant gas supply passage at a point between the oxidant gas supply blower and the cathode and joins the fuel gas supply passage at a point between the fuel gas flow control valve and the anode, and a communication valve which is able to shut off the communication passage; and the controller is further programmed to:
open the communication valve, which is normally closed during a normal operation of the power plant, when controlling the fuel gas purge device to supply the dry oxidant gas to the anode; and
drive the oxidant gas supply blower and the recirculation blower in a state where the anode effluent purge valve is open.

3. The fuel cell power plant as defined in claim 1, further comprising an anode effluent discharge passage combined with an anode effluent purge valve for discharging the fuel gas after reaction in the anode as an anode effluent, and a cathode effluent discharge passage combined with a cathode effluent purge valve for discharging the oxidant gas after reaction in the cathode as a cathode effluent, wherein
the fuel gas supply device comprises a fuel gas supply passage connected to the anode, a recirculation passage which recirculates the anode effluent in the anode effluent discharge passage to the fuel gas supply passage, a recirculation blower which promotes recirculation of the anode effluent in the recirculation passage, a recirculation valve provided in the recirculation passage, a fuel gas flow control valve which regulates a flow rate of the fuel gas in the fuel gas supply passage, wherein the recirculation passage is connected to the fuel gas supply passage between the fuel gas flow control valve and the anode, and connected to the anode effluent discharge passage between the anode and the anode effluent purge valve;
the oxidant gas supply device comprises an oxidant gas supply passage connected to the cathode and an oxidant gas supply blower disposed in the oxidant gas supply passage;
the fuel gas purge device comprises an air vent which introduces the oxidant gas into the recirculation passage and an air vent valve which opens and closes the air vent; and
the controller is further programmed to:
close the recirculation valve, which is normally open during a normal operation of the power plant, and open the air vent valve, which is normally closed during a normal operation of the power plant, when controlling the fuel gas purge device to supply the dry oxidant gas to the anode; and
drive the recirculation blower in a state where the anode effluent purge valve is open.

4. The fuel cell power plant as defined in claim 1, wherein the controller is further programmed to control the fuel gas purge device to start supplying the dry oxidant gas to the anode when an amount of the residual fuel gas in the anode has become equal to or less than 10 percent of the amount during a normal operation of the power plant or less.

5. The fuel cell power plant as defined in claim 1, wherein the controller is further programmed to control the fuel gas purge device to start supplying the dry oxidant gas to the anode according to an output voltage of the fuel cell stack.

6. The fuel cell power plant as defined in claim 5, wherein the fuel cell stack is constituted by plural unit cells, and the controller is further programmed to control the fuel gas purge device to start supplying the dry oxidant gas to the anode when the output voltage of the fuel cell stack has fallen to a range of 0.1-0.3 volts per unit cell.

7. The fuel cell power plant as defined in claim 5, wherein the fuel cell stack is constituted by plural stack sections, each of which is constituted by plural unit cells stacked in series, and the controller is further programmed to control the fuel gas purge device to start supplying the dry oxidant gas to the anode, when any one of a condition that the output voltage of the fuel cell stack has fallen to a range of 0.1-0.3 volts per unit cell and a condition that a minimum value of output voltages of the stack sections has decreased to zero volts is satisfied.

8. The fuel cell power plant as defined in claim 1, the controller is further programmed to control the oxidant gas supply device to supply the dry oxidant gas to the cathode at a maximum flow rate for a predetermined time period prior to control of the electrical loads to consume the power generated by the fuel cell stack.

9. The fuel cell power plant as defined in claim 1, wherein the first electrical load comprises any one of a secondary battery, an electric motor which drives the oxidant gas supply blower, an electric motor which drives the fuel gas recirculation blower, and an electric wire.

10. The fuel cell power plant as defined in claim 1, wherein the fuel cell stack is constituted by plural stack sections, each of which is constituted by plural unit cells stacked in series, and the controller is further programmed to determine that the residual fuel gas in the anode has been replaced with the dry oxidant gas when an output voltage of the fuel cell stack or output voltages of all the stack sections have decreased to substantially zero volts.

11. The fuel cell power plant as defined in claim 2, wherein the controller is further programmed to stop an operation of the oxidant gas supply blower and the recirculation blower, and close the fuel gas flow control valve, the anode effluent purge valve and the cathode effluent purge valve, after controlling the fuel gas purge device to stop supplying the dry oxidant gas to the anode.

12. The fuel cell power plant as defined in claim 3, wherein the controller is further programmed to stop an operation of the oxidant gas supply blower and the recirculation blower, and close the fuel gas flow control valve, the anode effluent purge valve, and the air vent valve, after controlling the fuel gas purge device to stop supplying the dry oxidant gas to the anode.

13. The fuel cell power plant as defined in claim 3, wherein the recirculation blower is disposed in the fuel gas supply passage.

14. The fuel cell power plant as defined in claim 3, wherein the recirculation blower disposed in the anode effluent discharge passage.

15. The fuel cell power plant as defined in claim 1, wherein the controller is further programmed to limit a period during which the oxidant gas supply device supplies the dry oxidant gas to the cathode within 30 seconds.

16. A control method of a fuel cell power plant, the power plant comprising a fuel cell stack comprising an anode and a cathode, and generating power according to a reaction of a fuel gas supplied to the anode and an oxidant gas supplied to the cathode, a fuel gas supply device which supplies the fuel gas to the anode, an oxidant gas supply device which supplies a dry oxidant gas to the cathode, a fuel gas purge device which supplies a dry oxidant gas to the anode, the method comprising:
controlling the fuel gas supply device to stop supplying the fuel gas to the anode in response to an operation stop command from outside;
controlling the oxidant gas supply device to supply the dry oxidant gas to the cathode;
controlling the electrical load to consume the power generated by the fuel cell stack;
controlling the fuel gas purge device to supply the dry oxidant gas to the anode when a residual fuel gas amount in the anode has decreased to a predetermined amount; and controlling the fuel gas purge device to stop supplying the dry oxidant gas to the anode when the residual fuel gas in the anode has been replaced with the dry oxidant gas, controlling a first electrical load and a second electrical load, the second electrical load made of an electric wire which has a lower power consumption rate than the first electrical load, and, connecting the first electrical load to the fuel cell stack after the fuel gas supply device has stopped supplying the fuel gas to the anode, then disconnecting the first electrical load from the fuel cell stack, and then connecting the second electrical load to the fuel cell stack before controlling the fuel gas purge device to supply the dry oxidant gas to the anode.

* * * * *